United States Patent [19]
Kupisz et al.

[11] Patent Number: 5,452,939
[45] Date of Patent: Sep. 26, 1995

[54] UPHOLSTERY COVER AND METHOD FOR POSITIVELY LOCATING COVER DURING FOAM MOLDING

[75] Inventors: Neal J. Kupisz, Tecumseh; Sandra L. Smith, Waterford, both of Mich.

[73] Assignee: Hoover Universal, Inc., Plymouth, Mich.

[21] Appl. No.: 103,580

[22] Filed: Aug. 9, 1993

[51] Int. Cl.[6] .................................................. A47C 1/10
[52] U.S. Cl. .................... 297/391; 297/220; 297/228.12; 297/219.1; 297/452.62
[58] Field of Search .................... 297/391, 220, 297/221, 228.12, 219.1, 452.48, 452.58, 452.62, DIG. 1

[56] References Cited

U.S. PATENT DOCUMENTS

| | | | |
|---|---|---|---|
| 2,782,839 | 2/1957 | Cole | 297/228.12 |
| 4,115,170 | 9/1978 | Sanson | 297/452.62 X |
| 4,738,809 | 4/1988 | Storch | 297/DIG. 1 X |
| 4,860,415 | 8/1989 | Witzke . | |
| 4,867,508 | 9/1989 | Urai | 297/452.62 |
| 4,987,666 | 1/1991 | Smith . | |

FOREIGN PATENT DOCUMENTS

| | | | |
|---|---|---|---|
| 359033 | 3/1906 | France | 297/221 |
| 2755924 | 6/1979 | Germany | 297/220 |
| 727741 | 4/1955 | United Kingdom | 297/220 |

*Primary Examiner*—Laurie K. Cranmer
*Attorney, Agent, or Firm*—Harness, Dickey & Pierce

[57] ABSTRACT

A method and an upholstery cover for fabricating an upholstered product which includes the steps of providing an upholstery cover having a hollow interior space and at least one positioning member having a portion thereof extending from the cover; positioning the cover adjacent to or against a foam molding fixture; securing the positioning member to the foam molding fixture to retain a portion of the cover in a predetermined location relative to the fixture; filling the hollow interior space of the cover with a liquid foaming agent; subsequently releasing the positioning member from the fixture; removing the filled cover from the fixture and finally, removing the extending portion of the positioning member from the cover.

1 Claim, 7 Drawing Sheets

UPHOLSTERY COVER AND METHOD FOR POSITIVELY LOCATING COVER DURING FOAM MOLDING

BACKGROUND AND SUMMARY OF THE INVENTION

The present invention relates to a method and an upholstery cover for fabricating upholstered articles and in particular to a method which utilizes a pour-in-place process to mold a foam pad within an upholstery cover.

Many upholstered articles, such as seat cushions, seat backs and headrest pads for vehicle seat assemblies, are manufactured using a pour-in-place foam process. In such a process, an upholstery cover is first formed which defines a hollow interior space. This interior space is subsequently filled with a liquid foaming agent which cures to form a resilient foam pad that is at least partially covered by the upholstery cover. The pour-in-place process replaces a process in which a preformed and preshaped foam pad is mechanically attached or adhesively bonded to the cover member.

While the pour-in-place process has several advantages over using a preshaped foam pad such as a reduction in manufacturing steps, the pour-in-place process does present some difficulties of its own. For example, the liquid foam does not always force the upholstery cover outward against a mold surface or otherwise force the cover to the desired final shape.

Several methods have been developed for assisting in ensuring that the upholstery cover is in the proper position when filled with the foam. One method is disclosed in U.S. Pat. No. 4,987,666, assigned to the Assignee of the present invention. In the process disclosed in that patent, the seams of the cover are sewn with a stiff plastic welt to provide additional stiffness to the cover at the seams. This added stiffness helps to maintain the seams of the upholstery cover in the proper alignment. After the pour-in-place foaming operation, the external portion of the welt is removed. While the welts help to maintain proper alignment of the seams, there is limited interaction between the welts and the mold fixture to hold the welt against the mold surface. Incomplete filling of the upholstery cover can still result as there is no assurance that the welt will remain in contact with the surface of the foam molding fixture.

Accordingly, it is an object of the present invention to provide a method and apparatus for assuring that an upholstery cover is properly positioned with respect to a foam molding fixture.

The method of fabricating an upholstered product according to the present invention includes the following steps. First, an upholstery cover is provided having a hollow interior space and at least one positioning member extending from the cover. Second, the upholstery cover is mounted to a foam molding fixture. Third, the positioning member is secured to the foam molding fixture to retain a portion of the cover in a predetermined location relative to the foam molding fixture. Fourth, the hollow interior space of the cover is filled with a liquid foaming agent. Fifth, the positioning member is released from the foam molding fixture. Sixth, the filled cover is removed from the foam molding fixture and lastly, the extending portion of the positioning member is removed from the cover.

Various foam molding fixtures can be used with the above method depending upon the particular article being produced. Likewise, the extending positioning member can take a variety of forms.

Further objects, features and advantages of the invention will become apparent from a consideration of the following description and the appended claims when taken in connection with the accompanying drawings.

DETAILED DESCRIPTION OF THE DRAWINGS

Figure 1:
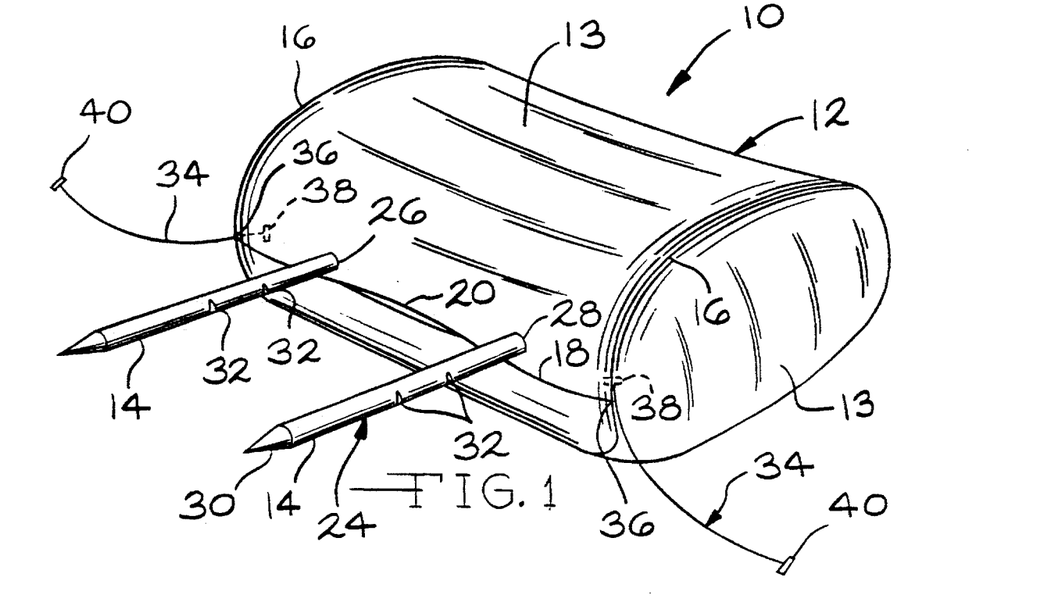
FIG. 1 is a perspective view of an upholstery cover prior to the pour-in-place foam molding.

The method of the present invention is described in detail with reference to FIGS. 1–6. In FIG. 1, a cover for a representative upholstered article is shown and designated at 12. Cover 12 is for a headrest pad for a motor vehicle seat assembly. The completed headrest includes a foam pad, upholstery cover 12 and a pair of support legs 14 extending therefrom. The upholstery cover 12 is made of several pieces 13 of sheet like upholstery material such as fabric, leather or vinyl joined together by end seams 16 and a bottom seam 18. The upholstery material has an exterior surface shown in the drawings and an interior surface. The center portion 20 of the seam 18 is left unsewn to enable the cover, after it is sewn together, to be turned right side out so that the seam allowance is on the inside of the cover. The opening 20 is also used to introduce the liquid foaming agent into the hollow interior space formed by the cover 12.

The support legs 14 are two legs of a single U-shaped rod 24. The rod 24 is passed through apertures 26 and 28 in the cover 12 by passing the end 30 of one leg 14 into the cover through aperture 26 and then out of the cover through the aperture 28. One or both of the legs 14 includes a plurality of detent notches 32 used to hold the finished headrest pad in an adjusted position relative to a seat back in a conventional manner.

According to the present invention, the cover 12 is sewn with string extending from the cover at the corners 36 where the two end seams 16 and the bottom seam 18 meet. The string can be a sewing thread or thread tail from a prior sewing operation or it may be a plastic string tie 34 as shown. One string tie 34 extends from each of the two corners 36. The ties have enlarged heads at the string ends, small head 38 and large head 40. The small heads 38 are on the inside of the cover 12. The ties can be installed during the sewing process or they can be subsequently installed using a conventional tool for pushing the small head 38 through the cover material. If the ties are sewn into the cover, either the small or the large heads can be placed inside the cover. The ties 34 are used to position the cover 12 within a foam molding fixture. By using a tool to install the ties, they can be placed anywhere in the upholstery material, not just at a seam.

Figure 2:
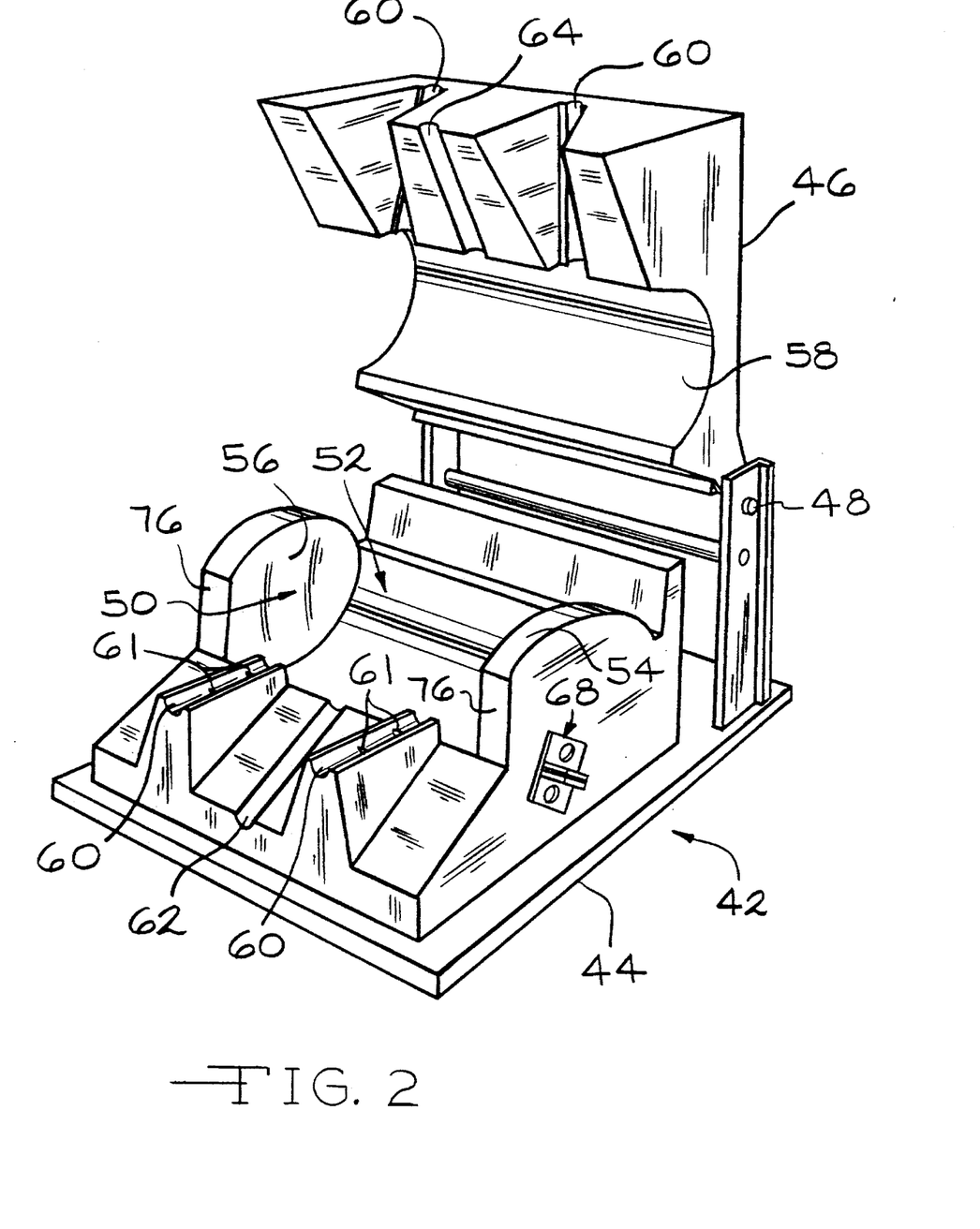
FIG. 2 is a perspective view of a foam molding fixture having a mold cavity and shown in an open position.

Such a fixture is shown in FIG. 2 and designated generally at 42. Fixture 42 includes a lower half 44 and an upper half 46 mounted to the lower half for rotation about a pivot 48. The upper and lower halves are contoured so as to form a cavity 50 of the desired shape for the finished upholstered article. The lower half 44 includes a recess 52 with two upstanding side walls 54 and 56 while the upper half includes a recess 58 open at its two ends. When the upper half is closed upon the lower half, the two recesses 52 and 58 and the upstanding side walls 54 and 56 form the cavity 50.

Semi-cylindrical support channels 60 in the top and bottom halves close upon the support legs 14 of the U-shaped rod 30. The channels 60 have projections 61 which seat in the detents 32 in the legs 14 to locate the rod 24 relative to the fixture 42.

The two fixture halves also have additional semi-cylindrical recesses 62 and 64 which are aligned with one another when the fixture is closed to form a fill passage 66. Passage 66 is used for introducing a liquid foaming agent into the cover 12 once it is placed within the fixture 42.

Figure 3:
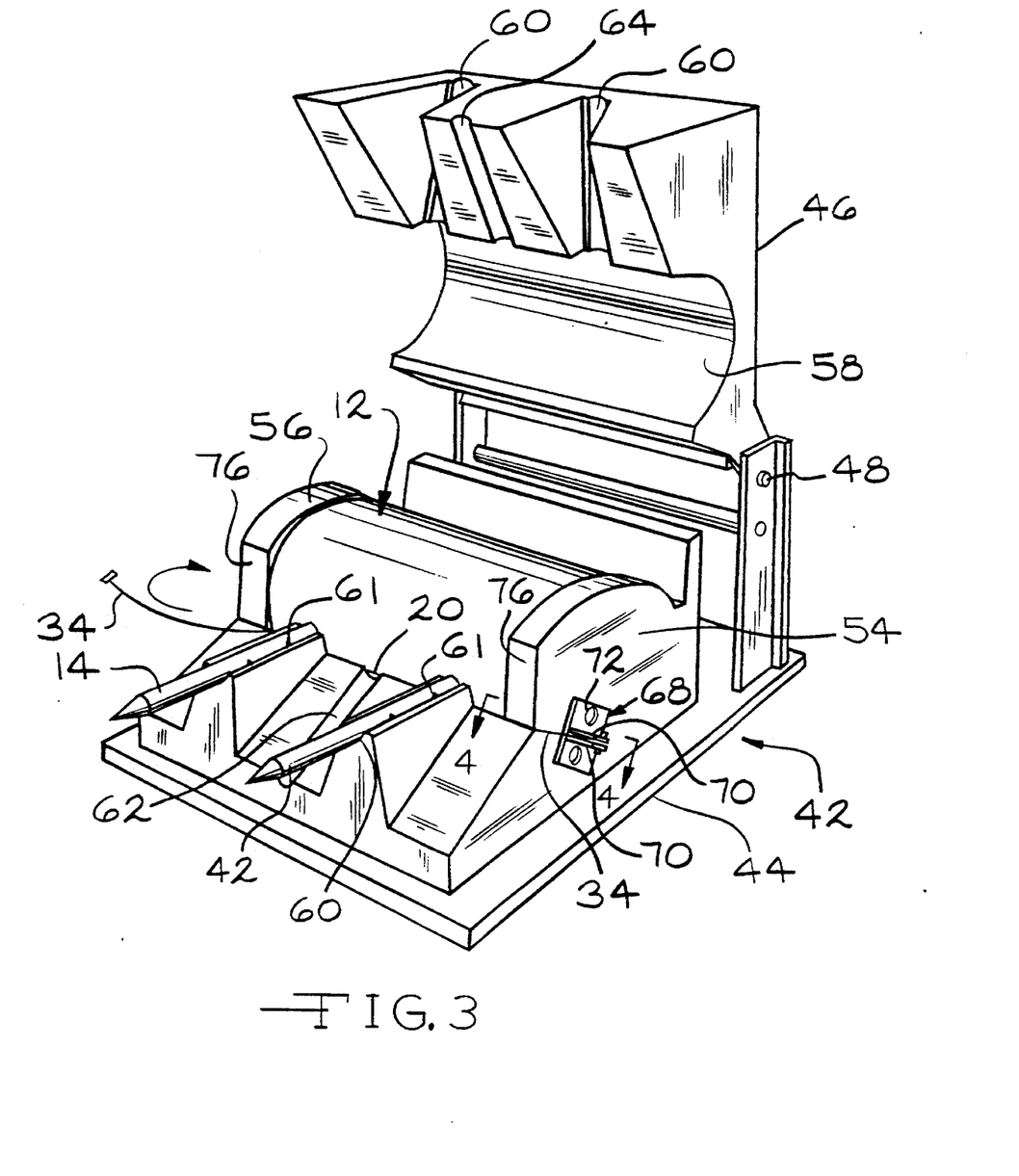
FIG. 3 is a perspective view of the foam molding fixture of FIG. 2 with the cover of FIG. 1 positioned therein.
Figure 4:
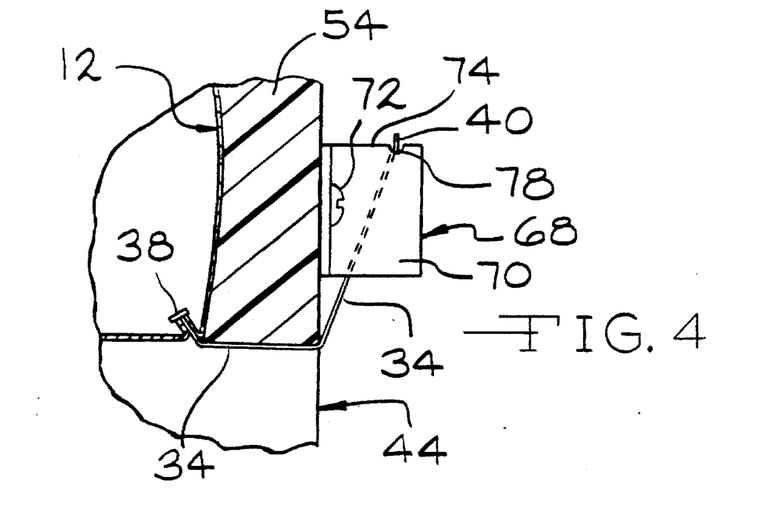
FIG. 4 is a sectional view as seen from substantially the line 4—4 of FIG. 3 showing a positioning member extending from the cover and secured to the foam molding fixture.

With reference to FIG. 3, the foam molding fixture 42 is shown with the cover 12 positioned therein. The fixture 42 includes mounting brackets 68 on the exterior sides of each of the upstanding walls 54 and 56, only one of which is shown in FIG. 3. The brackets 68 have a pair of plates 70 which project outwardly from the upstanding walls 54 and 56 and which are spaced slightly from one another. The brackets 68 are mounted to the upstanding walls by screws 72. The rear edge 74 of the plates 70, furthest from the front edge 76 of the upstanding walls 54 and 56, contains a detent 78. With the cover member 12 positioned in the fixture 42, the two ties 34 are both pulled around the walls 54 and 56 and positioned between the two plates 70. The enlarged heads 40 of the string ties are seated into the detents 78 in the brackets 68. The location of the brackets 68 and the lengths of the ties 34 are selected so that the ties apply a tensile force to the cover 12 along the seam 18. This tensile force draws the opening 20 closed and aligns the seam 18 in a straight line between the two corners 36. The brackets may also be spring assisted to provide a consistent force while accommodating various tie lengths. In addition to drawing the seam 18 straight, the ties also positively locate the cover within the mold fixture.

Figure 5:
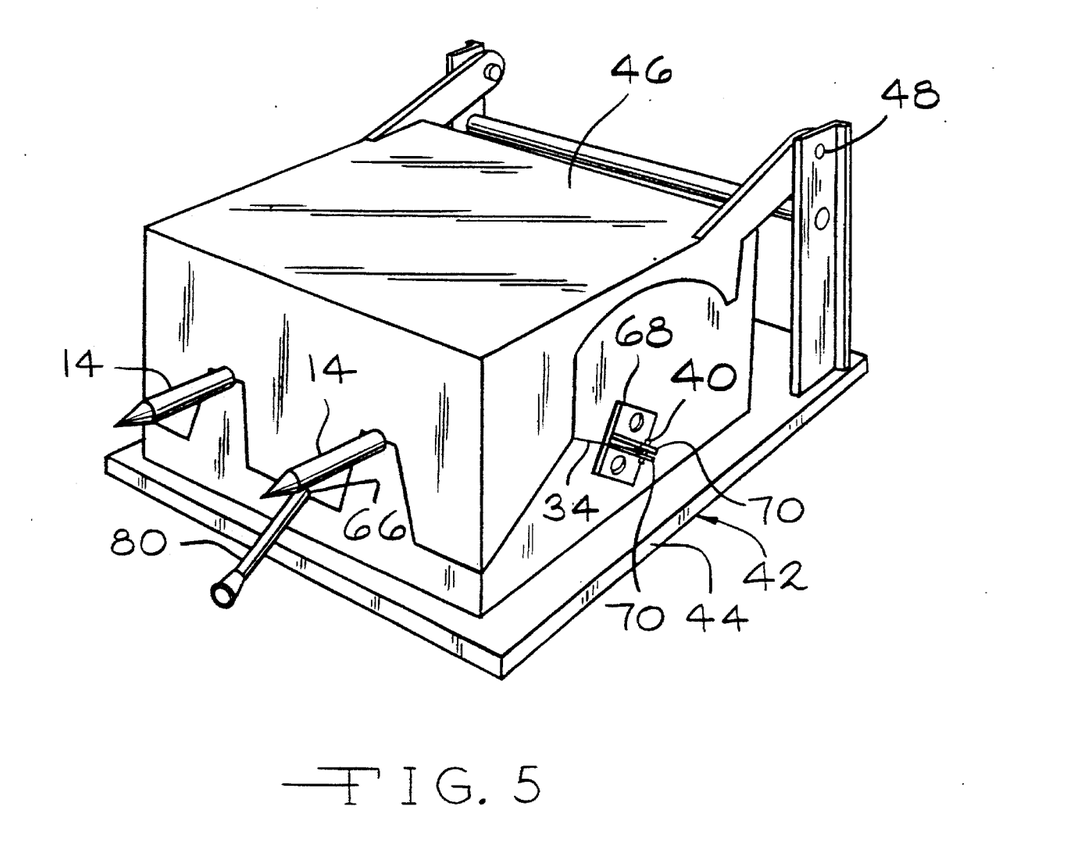
FIG. 5 is a perspective view of the fixture of FIGS. 2 and 3 in a close position.
Figure 6:
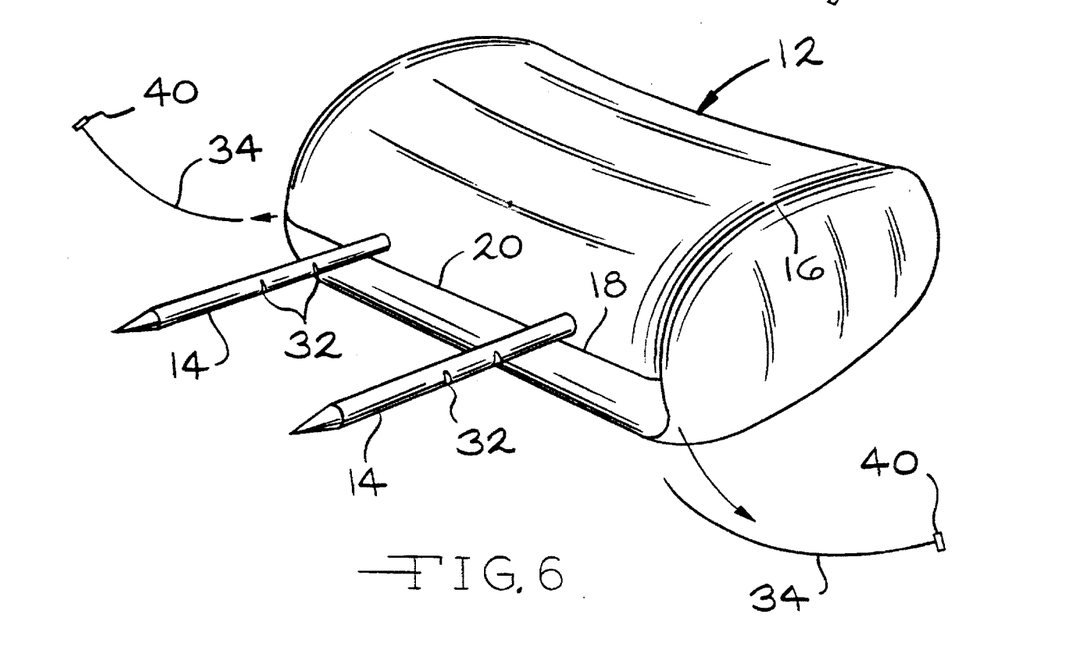
FIG. 6 is a perspective view of the finished upholstered article showing the extending positioning members being removed therefrom.

A foam fill tube 80 is inserted into the fill passage 66 formed by the two semi-cylindrical recesses 62 and 64. Tube 80 is inserted through the opening 20 into the hollow interior space of the cover 12. The cover is drawn tightly around the tube 80 by the string ties 34. A liquid foam agent is injected into the cover 12 through the tube 80 to fill the hollow interior space. The foam can also be directly injected into the cover, eliminating the fill tube, especially with the use of spring assisted brackets. The foam, when cured, forms a resilient foam pad within the cover 12. After the cover has been filled with foam, it is removed from the fixture 42 as shown in FIG. 6. The portions of the ties 34 extending from the cover 12 are then removed from the cover by cutting the strings close to the cover. The result is an upholstered headrest pad in which the bottom seam is formed in a straight line and is closed tightly even though it is not sewn completely across its length.

With reference to FIGS. 7 through 10, another foam molding fixture is shown and described for use with the method of the present invention. Fixture 84 is designed for use with an upholstery cover 86, again forming a seat assembly headrest. The cover 86 is sewn from multiple pieces of upholstery material having seams 88, 90, and 102. The cover member forms a substantially U-shaped body having an upper portion 92 and spaced lower portions 94. The headrest is inverted in the figures so that the upper portion 92 is below the upper portions 94. A U-shaped support rod 96 has a pair of legs 98 and 100 which, like the legs 14 described earlier, contain detents 101 shown in FIG. 10 for positioning the headrest relative to a seat back.

Figure 7:
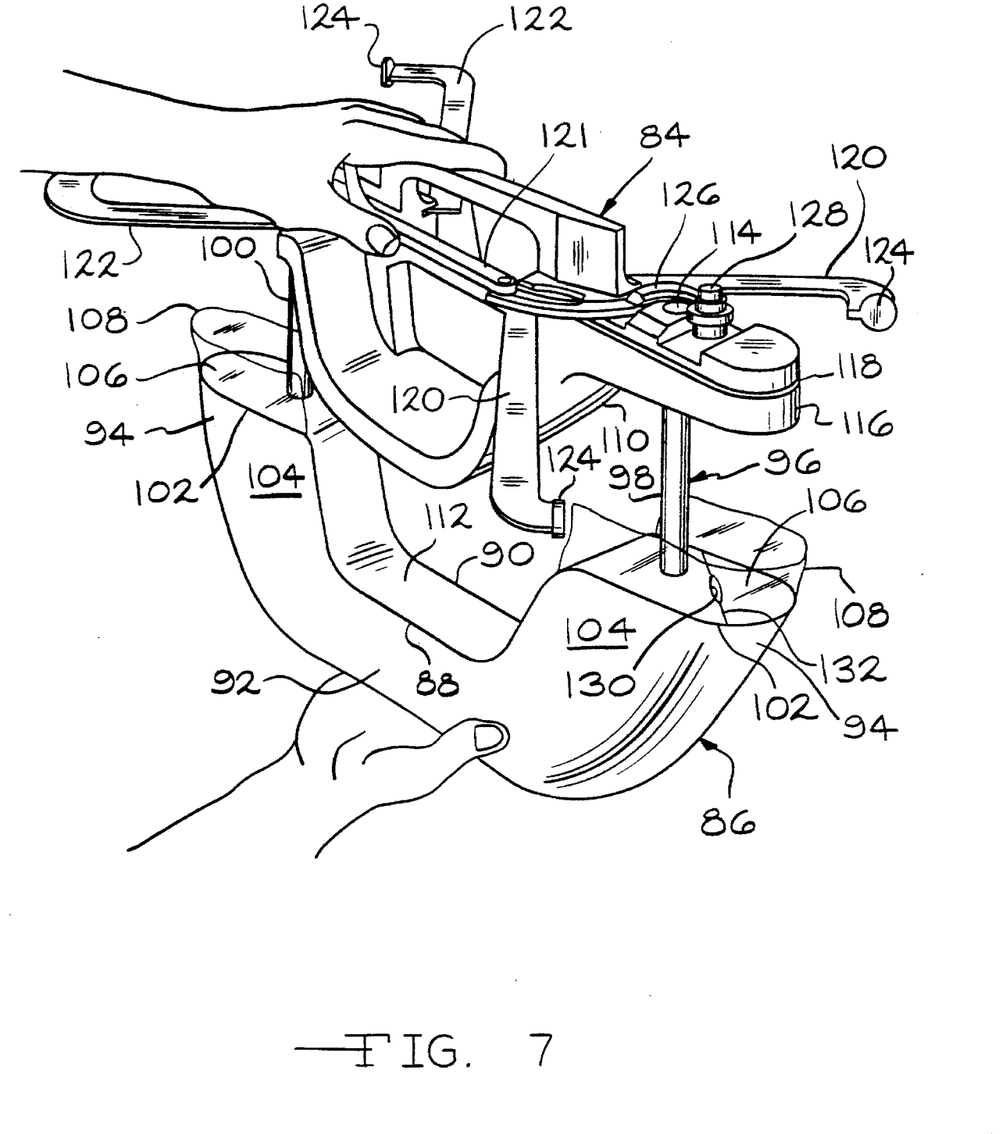
FIGS. 7 and 8 are perspective views of an alternative embodiment of the foam molding fixture for use with another upholstery cover showing the cover being installed in the fixture.

The seams 102 between the sides 104 and the bottom panels 106 of the cover 86 include a thin plastic skirt 108 extending therefrom. The plastic skirts 108 are shown as being transparent but can be made of any thin sheet material.

In FIG. 7, the cover 86 is shown being mounted to the fixture 84 which has a lower surface 110 forming a lid for engagement with the surface 112 of the cover 86. The fixture includes a pair of apertures 114 through which the legs 98 and 100 of the support rod extend when mounted to the fixture.

Figure 8:
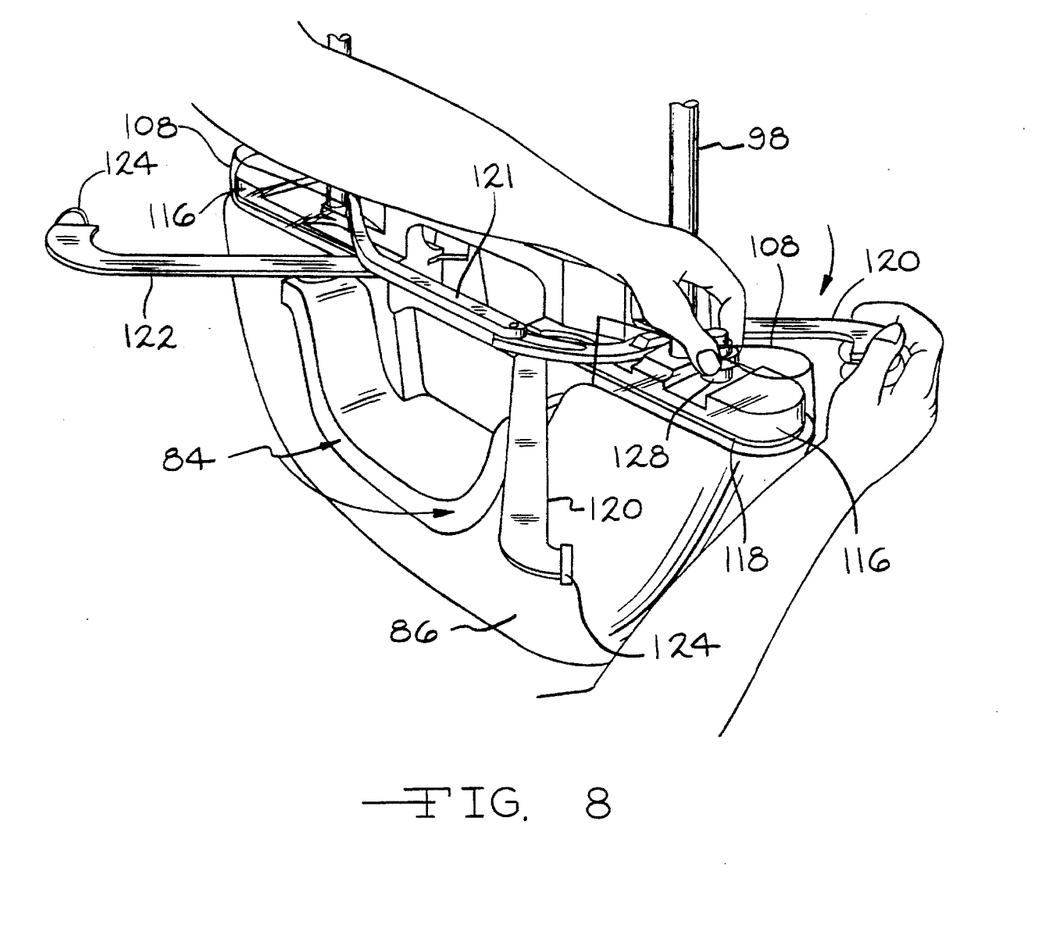

With reference to FIG. 8, when the cover 86 is brought up into engagement with the fixture 84, the skirts 108 surround the end portions 116 of the fixture. The end portions 116 each contain a groove 118 about the periphery thereof. With the cover in place, arms 120 and 122 at opposite ends of the fixture are pivoted into engagement with the grooves 118, drawing the plastic skirts 108 into the grooves. The arms 120 and 122 are mounted by linkages 121 that allow the arms to pivot into and out of the grooves. The distal ends of the arms 120 and 122 include fasteners 124, either magnetic or mechanical, which cooperate with one another to hold the arms in a closed position shown in FIG. 9 gripping the skirts 108 in the grooves 118.

Figure 9:
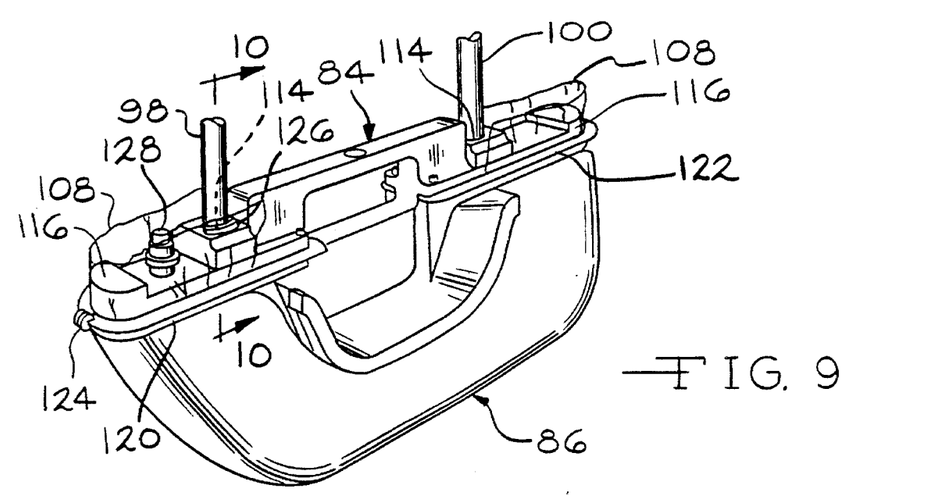
FIG. 9 is a perspective view showing the upholstery cover mounted to the fixture.
Figure 10:
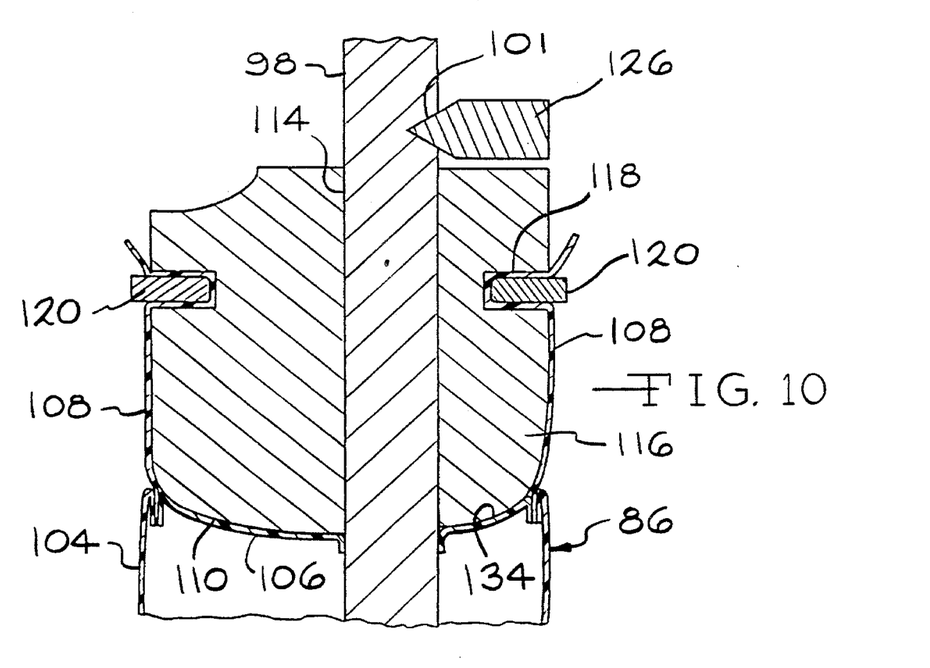
FIG. 10 is a sectional view of the cover and the fixture as seen from substantially the line 10—10 of FIG. 9.

The fixture 84 includes a lock lever 126 which rotates into a lock position seated within one of the detents 101 in the leg 98. This positions the support rod 96 relative to the fixture while the skirts 108 position the cover 86 relative to the fixture.

A funnel 128 in the fixture is used to supply the foaming agent to the interior space of the cover 86 through the opening 130 formed along the seam 132 in one bottom panel 106 of the cover. After the cover has been filled with the foaming agent, the cover is removed from the fixture by reversing the process of installation i.e., by withdrawing the arms 120 and 122 from the grooves 118 and by removing the lock lever 126 from the detent 101 in leg 98. After removal from the fixture, the plastic skirts 108 are torn from the cover 86 along the seams 102, leaving a finished appearance to the head rest pad. The sewing operation forms a plurality of perforations in the skirt 108, allowing it to tear easily along the seam.

The bottom surface 134 of the fixture is formed convex to shape the bottom panel 106 concave. This helps to conceal the bottom panel 106 of the headrest, producing a finished appearance. The concave surface also allows the headrest to mate with the curved upper surface of a seat back.

The method of the present invention utilizes removable positioning members for the cover to ensure proper placement of the cover during foam molding. While the method has been described within the context of forming an upholstered headrest pad, other upholstered products can be formed utilizing the broad principals of the method.

It is to be understood that the invention is not limited to the exact construction and method illustrated and described above, but that various changes and modifications may be made without departing from the spirit and scope of the invention as defined in the following claims.

We claim:

1. A cover for an upholstered article comprising:

multiple pieces of a sheet upholstery material sewn together with one or more seams, said sheet upholstery material having an interior side and an exterior side and said multiple pieces being sewn together to define a hollow interior space for a foam pad, at least one of said seams being along a substantially straight line and having opposite ends; and a pair of elongated string ties having opposite ends and having an enlarged head at each of said ends, said pair of ties being attached to said cover at said opposite ends of said one seam and extending therefrom with one enlarged head on each tie being located in the hollow interior space of said cover and the other enlarged head of each tie being on the exterior of said cover whereby said two ties can be pulled in opposite directions away from one another to hold said one seam straight between said seam ends.

* * * * *